Patented Mar. 3, 1942

2,275,210

UNITED STATES PATENT OFFICE 2,275,210

PROCESS FOR LIQUID PURIFICATION

Oliver M. Urbain and William R. Stemen, Columbus, Ohio, assignors to Charles H. Lewis, Harpster, Ohio No Drawing. Application January 14, 1938, Serial No. 185,069

7 Claims. (Cl. 210—24)

This invention relates to liquid purification. More specifically, it relates to the removal of both anions and cations from liquids by a process of anion and cation exchange.

Processes of cation exchange have been known for a number of years, and there have recently been perfected satisfactory processes of anion exchange. By the use of such anion and cation exchange processes in sequence, it has been possible to purify liquids, i. e., remove both anions and cations to obtain solutions of increased purity or of desired composition. It is to be noted, however, that such processes are necessarily two-step processes involving two materials and thereby prolonging the treatment time and involving added expense incident to a two-stage operation.

There is considerable demand in modern industry for water of high purity, i. e., free of cations and anions. For example, it is known that high pressure boilers operating at approximately 2500 pounds' pressure are at least twenty-five per cent more efficient than boilers operating at low pressure, but the lack of a satisfactory and economical method for producing a boiler water of the high degree of purity required by high pressure boilers has prevented the commercial adaptation of the more efficient boiler systems.

There are many other fields in which a water comparable to distilled water in purity is desired. The lack of satisfactory methods of economically producing water of high degree of purity has been a serious handicap in such industries as paper, drug, and chemical manufacture, the dyeing industries, and many other fields.

It is an object of this invention to provide a process of liquid purification by which both anions and cations may simultaneously be removed by exchange from the liquids. It is further an object of this invention to provide processes by which waters comparable in purity to distilled water may be prepared by a one-step process. It is additionally an object to provide a process by which one material only is necessary to effect electrolyte removal. A further object of this invention is to provide processes of regeneration of such anion and cation exchange materials. Other objects of this invention will be apparent to those skilled in the art from the description contained in this specification and the accompanying claims.

The invention resides in the discovery that solid amphoteric organic materials of low solubility, possessing the properties of exchanging their acidic and basic ions or groupings, may be employed to effect a simultaneous anion and cation exchange purification of liquids. Such materials must have a solubility not greater than 0.03 gram in 100 cc. of water at 20° C. and must be solid at all temperatures below 30° C. These materials must of necessity be amphoteric; i. e., they must possess both negative and positive ions or groupings in an exchange position.

Examplary of the materials which may be employed to effect simultaneous anion and cation exchange is the following:

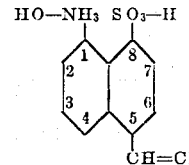

8-sulfo-5-vinyl-1-naphthylammonium hydroxide

This compound is a solid amphoteric organic material of low solubility and possesses exchangeable positive and negative ions. Although it is a well-known compound, the fact that it possesses both exchangeable anions and cations has not been previously known. The hydroxyl group attached to the ammonium radical in the 1 position is an exchangeable anion, while the hydrogen attached to the sulfo group in the 8 position is an exchangeable cation. When this material is brought into contact with a water containing electrolytes, these ions exchange places with the ions of the electrolytes in the water treated. There is thus effected a simultaneous cation and anion exchange.

Other materials possessing the properties of anion and cation exchange may be represented by the following structural formulae:

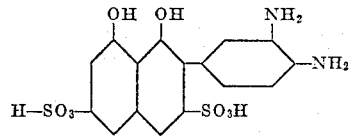

2-(3,4-diaminophenyl)-1,8-dihydroxy,3,6-naphthalene-disulfonic acid

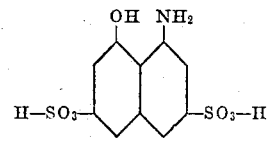

1 amino-8-hydroxy, 3,6-naphthalene disulfonic acid

It will be noted that each of these compounds contains replaceable hydrogen atoms as indicated by the SO₃H group and also contains one or more hydroxyl groups.

Many other organic materials possessing similar properties are available for use in this process. The acidic grouping of such materials is not confined to the SO₃H grouping of the above compound but may be an acidic phenol grouping, a carboxyl grouping, etc. Likewise many other basic groupings may be substituted for the NH₃OH grouping shown in the above material. Any of the ammonium type groupings, such as sulfonium, oxonium, arsonium, selenonium, carbonium, etc., may be used as the basic grouping.

It should also be understood that the salts of these amphoteric organic materials, if solid and of low solubility, may be used to effect positive and negative anion exchange and are included by the term "solid amphoteric organic materials of low solubility" as used throughout this specification and the accompanying claims. Such materials have utility in replacing undesired electrolytes in liquids with unharmful or possibly desired electrolytes. For example, the sodium chloride salt of the first material illustrated above might be availed of to replace the objectionable calcium bicarbonate in water desired for boiler purposes. The sodium chloride salt of this compound may be represented by the following formula:

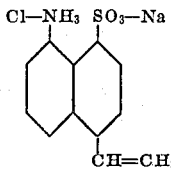

8-sodium sulfo-5-vinyl-1-naphthylammonium chloride

A number of organic materials possessing anion and cation exchange properties may be found to be unsatisfactory because of their solubility. It has been found that the solubility of such compounds may be reduced by polymerizing these compounds by conventional polymerization methods. The reactive groups may be blocked off by forming ester and amide groupings prior to the polymerization and subsequently hydrolyzing off the ester and amide groupings. The polymerized molecules will then be found to have reactive anion and cation groups, and in addition their solubility will be below that of the starting materials.

From the foregoing, it will be seen that the materials employed to effect a simultaneous anion and cation exchange process are solid amphoteric organic compounds of low solubility having the general formula:

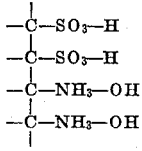

Amphoteric exchange material

It is to be understood that the number of replaceable anions or cations may vary and that the above formula is given as exemplary only. Polymerized products may contain many of the radicals illustrated by the given exemplary formula, or radicals possessing similar properties.

The exchange materials thus prepared are employed in liquid purification by the methods conventional to anion or cation exchange. They may be utilized in contact filters and adapted for use in the filter bed type of liquid treatment apparatus. Or such materials may be added directly to the liquid with agitation, after which the converted exchange compounds are separated and removed from the purified or treated liquids.

Reactions of solid amphoteric organic exchange materials described above with liquids containing ions, both negative and positive, which one may be desirous of removing from solution, are given in the following equations. For purposes of illustration, the exchange material is represented by the formula just given, but it is to be understood that such materials may vary in their composition and may contain a plurality of active anion and cation groupings.

If it is desired to remove calcium chloride from a liquid, the mechanism of removal when employing an exchange material of the nature described would be as follows:

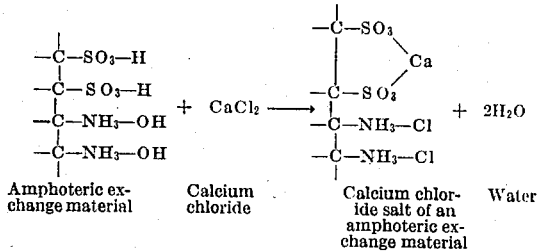

Or it may be desired to remove magnesium sulfate from a solution through the use of an amphoteric organic exchange material of the nature described. The mechanism of such an exchange is indicated by the following equation:

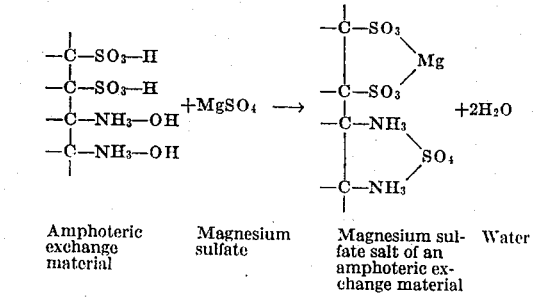

Organic compounds may be satisfactorily removed from liquids through the use of the described amphoteric exchange mediums. The purification of a liquid containing ethyl-acetate may be exemplified by the following equation:

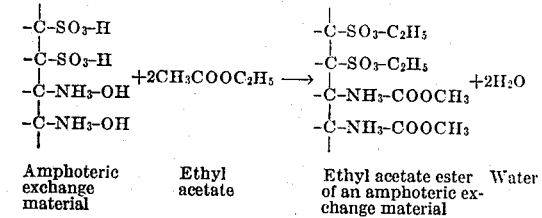

It may be seen from the above reactions that both the positive and negative ions of the electrolytes have replaced the hydrogen and hydroxyl ions of the exchange material with the resultant formation of water. Thus the electrolytes contained within the liquid being treated have been replaced by molecules of water, and there results a highly purified liquid free from the objectionable ions of the electrolytes.

In addition to the exchange reactions which such materials effect, there may be sorption by certain of the compounds to effect some removal of electrolytes and impurities. It is believed, however, that the mechanism of the reaction is primarily one of ionic exchange.

This type of amphoteric organic exchange materials may be regenerated by treatment with hot water (or steam), alkalis, or acids. The method of regeneration will depend upon the purpose for which the regenerated material is to be used. The preferred method of regeneration is through the use of hot water or steam. The regenerated solution may be flowed through the exchange material in the conventional regeneration process, or the exhausted exchange material may be treated with the regenerated liquid in vats or containers.

The regeneration of a salt of an amphoteric exchange material which has been used to remove calcium chloride ions from water may be illustrated by the following equation:

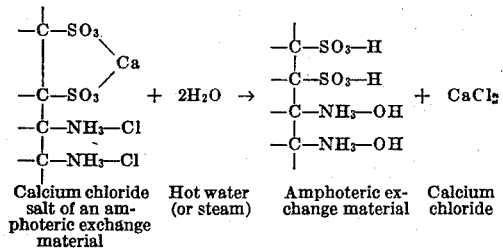

| Calcium chloride salt of an amphoteric exchange material | Hot water (or steam) | Amphoteric exchange material | Calcium chloride |

In accordance with this equation, the exhausted exchange material will be completely regenerated and, after regeneration, will be as effective an exchange medium as when originally employed.

Regeneration through the use of alkalis and acids is necessarily a two-step process. The exhausted exchange medium is first treated with an alkali to replace the negative ions of the electrolytes with hydroxyl groups. It is subsequently treated with an acid to replace the positive ions of the electrolytes with positive hydrogen cations. The resultant material possesses anion and cation exchange properties comparable in effectiveness to the original material.

It will, of course, be understood that such materials may be only partially regenerated; i. e., either the anion or cation group may be regenerated, after which such materials may be employed to effect anion or cation exchange as may be desired. Regeneration with alkalis alone will produce a material capable of anion exchange while regeneration with acids alone will produce a cation exchange material.

It is to be expressly understood that the foregoing description and examples are merely illustrative and are not to be considered as limiting this invention beyond the scope of the subjoined claims.

Having thus described our invention, we claim:

1. A process of liquid purification which comprises simultaneously exchanging anions and cations by contacting the liquid with a solid amphoteric organic material of low solubility in water and having both anion and cation exchanging properties.

2. A process for producing water comparable in purity to distilled water which comprises simultaneously removing electrolyte anions and cations by contacting the water with a solid amphoteric organic material of low solubility in water and having both anion and cation exchanging properties.

3. A process of liquid purification which comprises simultaneously exchanging both anions and cations in liquids by contacting the liquid with an organic compound characterized in that it possesses at least one replaceable anion and cation grouping.

4. A process for simultaneously exchanging both anions and cations in liquids which comprises contacting the liquid with a polymer of a solid amphoteric organic material of low solubility in water characterized in that it possesses high anion and cation exchange capacity.

5. A process for simultaneously exchanging both anions and cations in liquids which comprises contacting the liquid with a solid amphoteric organic material of low solubility in water characterized in that it possesses high anion and cation exchange capacity and is capable of being regenerated without appreciable loss.

6. A process for simultaneously exchanging both anions and cations in liquids which comprises the steps of adding a solid amphoteric organic anion and cation exchange material of low solubility in water to the liquid, agitating for a short period, and effecting removal of the converted exchange material.

7. In a process for treating liquids having anions and cations, the step of contacting said liquid with an amphoteric organic anion and cation exchange material of low solubility in said liquid and characterized by its property of simultaneously exchanging its anions and cations for the anions and cations of said liquid.

OLIVER M. URBAIN.
WILLIAM R. STEMEN.